UNITED STATES PATENT OFFICE.

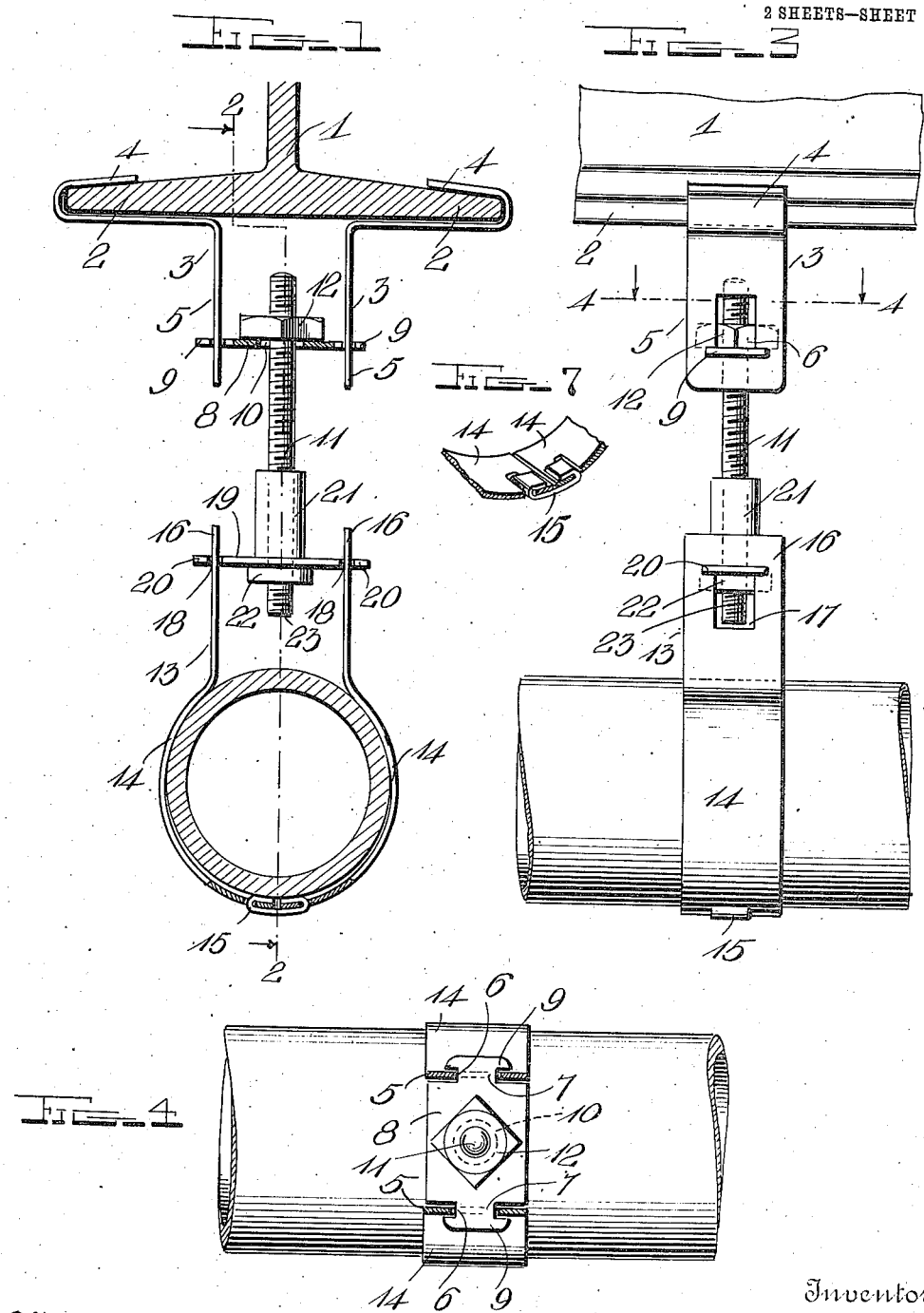

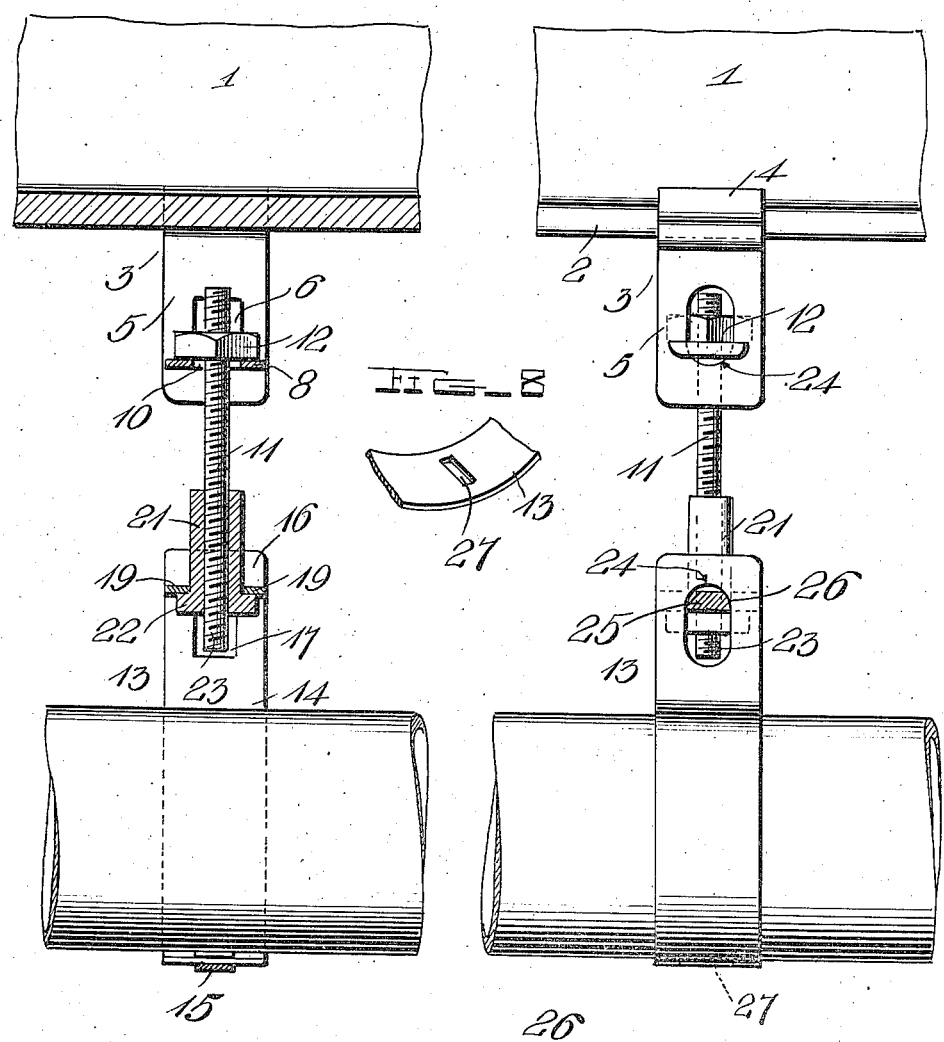

ARTHUR A. NOYES, OF NEW YORK, N. Y.

PIPE-HANGER.

948,902.  Specification of Letters Patent.  Patented Feb. 8, 1910.

Application filed May 13, 1909. Serial No. 495,700.

*To all whom it may concern:*

Be it known that I, ARTHUR A. NOYES, a citizen of the United States, residing at New York, in the county of New York and State of New York, have invented certain new and useful Improvements in Pipe-Hangers; and I do declare the following to be a full, clear, and exact description of the invention, such as will enable others skilled in the art to which it appertains to make and use the same.

This invention relates to a pipe hanger, and has for its object to provide a simple device of this kind by means of which the pipe may be held in close proximity to the wall and which may be readily adjusted as circumstances may require.

With this and other objects in view, the invention consists of certain novel features of construction, combination and arrangements of parts, as will be more fully described and particularly pointed out in the appended claims.

In the accompanying drawings: Figure 1 is an end elevation of a pipe hanger, constructed in accordance with the invention as arranged in position, with parts broken away. Fig. 2 is a vertical transverse section taken on the line 2—2 of Fig. 1. Fig. 3 is a view taken at right angles to Fig. 1. Fig. 4 is a horizontal section on the line 4—4 of Fig. 3. Fig. 5 is an end view of a modified form of the stirrup or clamp. Fig. 6 is a detail perspective view of the yoke for connecting the ends of the stirrup or clamp, shown in Fig. 5. Fig. 7 is a sectional perspective view of the lower ends of the preferred form of stirrup and connecting clip; and Fig. 8 is a fragmentary perspective view of the central portion of the modified form of stirrup.

Referring to the drawings for a more particular description of the invention, 1 indicates a steel beam or girder which is provided with the usual base flanges, 2, from which the pipe holder is suspended from or attached to the beam 1, by the clamping members 3, having the hook shaped portion, 4, to receive said base flanges. The clamping members are also provided with depending legs, 5, which are formed with longitudinal rectangular slots 6, which receive the portions or extensions 7, of the upper yoke 8. The outer ends of the extensions of the yoke, 8, are provided with the heads 9, in order to hold the extensions in the slots of the legs, 5, of the clamping members 3. The upper yoke 8, is also provided with a central vertical opening 10, through which extends the upper threaded end of the hanger rod 11. A nut 12 is screwed upon the upper threaded end of the hanger rod 11, to support the latter from the yoke.

The stirrup or pipe clamp 13, comprises two corresponding sections 14, which are hingedly connected at their lower ends by the clip 15, which provides for the adjustment of the band or stirrup after the fittings are secured in place. The upper ends of the pipe clamp sections are also provided with the upstanding portions 16, which are provided with the central longitudinal rectangular slots 17, which receive the reduced extensions 18, formed at opposite ends of a lower yoke 19, for connecting the portions 16, together. These extensions are also provided with heads 20, to hold them in the slots of the portions 16. A tubular interiorly threaded nut 21, extends through a corresponding aperture in the lower yoke with its head 22, bearing against the under surface thereof. This adjusting nut receives the lower threaded end 23, of the hanger rod 11, and thus supports the clamping member in position. To adjust the pipe clamp vertically in order to bring the pipe as near the ceiling or wall as possible, it is only necessary to turn the adjusting nut by a wrench or other tool. The form of pipe hanger shown in Figs. 1 to 4, inclusive, is especially designed for use in connection with large size pipes that require no provision for expansion. When the hanger is used for supporting a steam or other pipe which requires provision for expansion, the slots in the upstanding portions of the stirrup or clamp 13 as well as in the legs of the clamping members 3, are made rounded at their ends, as at 24 and 24', while the sides of the extensions 25, of the lower yoke are rounded, as at 26, and the extension of the upper yoke being also rounded. By forming the stirrup or pipe clamp 13, and the lower yoke as shown in Figs. 5 and 6, the pipe clamp or stirrup is allowed to swing upon the extensions of the lower yoke to provide for longitudinal contraction or expansion of the steam pipe. Also when the pipe hanger is made in the form shown in Figs. 5 and 6, the clip 15, is dispensed with and the stirrup made in one piece which is apertured at the center, as at 27, so as to weaken the stirrup at this point in order to permit the ends of the stirrup to be slightly opened when it is desired to adjust the same.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim as new is:

1. A pipe clamp of the class described, comprising beam engaging members having depending longitudinally slotted legs, a horizontal upper yoke having its ends detachably engaged with the slotted portions of the legs of the beam engaging members, a threaded hanger rod supported by said yoke, a pipe stirrup or clamping member comprising two hinged sections, a lower yoke for connecting the upper ends of the stirrup sections, said yoke having a vertical aperture for the reception of the lower end of the hanger rod, and a tubular adjusting nut extending through the aperture of the lower yoke, and screwing upon the lower end of the hanger rod with its head fitting against the under face of said yoke for adjusting the pipe stirrup or clamp vertically.

2. A pipe clamp of the class described, comprising beam engaging members having straight depending longitudinally slotted legs, a horizontal upper yoke having reduced headed ends mounted in the slotted portions of the legs of said beam engaging members, a pipe stirrup provided with straight upper longitudinally slotted ends, a lower yoke having reduced headed ends engaged with the slots of said stirrup sections, a threaded hanger rod passing said yokes, a nut screwing on the upper end of said rod upon the upper yoke, and a tubular headed adjusting nut screwing upon the lower end of the rod with its head fitting against the under face of the lower yoke.

In testimony whereof I have hereunto set my hand in presence of two subscribing witnesses.

ARTHUR A. NOYES.

Witnesses:
A. J. AGATE,
LOUIS H. MEYER.